United States Patent [19]

Ishikawa

[11] Patent Number: 4,594,912
[45] Date of Patent: Jun. 17, 1986

[54] BANJO TYPE AXLE CASING

[75] Inventor: Masakazu Ishikawa, Toyoake, Japan

[73] Assignee: Toyota Jidosha Kogyo Kabushiki Kaisha, Aichi, Japan

[21] Appl. No.: 166,785

[22] Filed: Jul. 8, 1980

[30] Foreign Application Priority Data

Jul. 19, 1979 [JP] Japan .................................. 54-92394

[51] Int. Cl.$^4$ .......................................... F16H 57/02
[52] U.S. Cl. .................................... 74/607; 74/606 R
[58] Field of Search ........................... 74/606, 607, 710

[56] References Cited

U.S. PATENT DOCUMENTS

| 1,283,143 | 10/1918 | Fries . | |
|---|---|---|---|
| 1,384,480 | 7/1921 | Murray, Jr. et al. | 74/607 |
| 1,437,474 | 12/1922 | Mogford . | |
| 1,916,866 | 7/1933 | Porter et al. . | |
| 3,025,716 | 3/1962 | Muller | 74/607 |
| 4,068,541 | 1/1978 | Sakamoto et al. | 74/606 R |

FOREIGN PATENT DOCUMENTS

| 222903 | 6/1909 | Fed. Rep. of Germany . | |
|---|---|---|---|
| 60188 | 7/1913 | Fed. Rep. of Germany | 74/607 |
| 749727 | 9/1949 | France | 74/607 |
| 51-123513 | 10/1976 | Japan | 74/607 |

OTHER PUBLICATIONS

Book of Bussien "Automobiltechnisches Handbuch" 2nd vol. published 1965.

Primary Examiner—Kenneth J. Dorner
Assistant Examiner—Vinh Luong
Attorney, Agent, or Firm—Parkhurst & Oliff

[57] ABSTRACT

In a banjo type axle casing comprising an enlarged center case portion for housing a differential gear and a pair of sleeve-like case portions outwardly extending from opposite ends of said center case portion for housing an axle shaft, an oil deflector for covering the axle shaft is provided, wherein said oil deflector is formed of a thin sheet wound into a cylindrical form, only one end of said oil deflector is restrained, the other unrestrained end of said oil deflector is inserted into and engaged with the inner peripheral surface of said sleeve-like case portions as an outer end which is freely deformable along the inner peripheral surface of said sleeve-like case portions, and the restrained end is spaced apart at a predetermined interval from the differential gear as an inner end.

10 Claims, 7 Drawing Figures

BANJO TYPE AXLE CASING

BACKGROUND OF THE INVENTION

1. Field of the Invention

This invention relates to a banjo type axle casing, and more particularly to improvements in a banjo type axle casing, which is suitable for use in a rear driving axle shaft of a motor car, comprising an enlarged center case portion for housing a differential gear and a pair of sleeve-like case portions outwardly extending from opposite ends of said center case portion for housing an axle shaft.

2. Prior Art

A reduction gear and a differential gear are mounted in the center portion of an axle casing for housing a driving axle shaft in a motor car or the like, and said axle casing is of a banjo type, carrier type or split type in accordance with the form and system thereof. From among those types, a banjo type axle casing 10, as shown in FIG. 1, comprises an enlarged center case portion 10a for housing a differential gear and a pair of sleeve-like case portions 10b outwardly extending from opposite ends of said center case portion 10a for housing an axle shaft. Such a banjo type axle casing includes one in which the center case portion is made of malleable cast iron or cast steel and a steel pipe is pressed into opposite sides of said center case portion, one in which sheets of steel are formed by press work and welded to one another, one entirely made of cast steel, one in which only the center case portion is formed by press work and a steel pipe is welded to opposite sides of said center case portion, or the like. Said banjo type axle casing, in which a reduction gear assembled separately is secured to said axle casing, is convenient for adjusting the reduction gearing and easy to manufacture, and hence, widely used at present. In the axle casings such as said banjo type axle casing, lubricating oil is filled in the inner lower portion of the center case portion for lubricating the differential gear housed in said center case portion. However, heretofore, said lubricating oil has flowed out from the center case portion in a direction of the sleeve-like case portion for housing the axle shaft when the motor car turns in running direction or runs in a laterally tilted condition, and the lubricating oil is temporarily separated from the differential gear, with no lubrication being effected in the differential gear. When this condition is sustained, such disadvantages have been presented that seizure of gears takes place and unusual noises occur.

In order to obviate the disadvantages as described above, a belt-like shield plate made of thin sheet steel or the like and provided at the center thereof with an insert hole for receiving an axle shaft has been fitted in set plates and the like spot-welded to upper and lower portions of the center case portion of the axle casing by utilizing the resiliency of said shield plate so as to have a deflecting action, so that nonuniform distribution of the lubricating oil can be prevented. There have been raised such problems that the fitting property of the shield plate may be low, or a large gap is formed between the axle casing and the shield plate during manufacture, so that the flow of the lubricating oil cannot be always effectively prevented.

On the other hand, to obviate those problems raised with the oil deflector formed only by the conventional belt-like shield plate, such a banjo type axle casing may be proposed which comprises an enlarged center case portion for housing a differential gear and a pair of sleeve-like case portions outwardly extending from opposite sides of said center case portion for housing the axle shaft, and a cylindrical member for covering an axle shaft, the inner end of which is spaced apart at a predetermined interval from the differential gear and the outer end of which is inserted into and engaged with the inner peripheral surface of said sleeve-like case portions. This banjo type axle casing has an advantageous feature of preventing the flow of lubricating oil to a certain extent. However, since the cylindrical member is formed of a thin sheet wound into a cylindrical form and the opposite ends thereof are both restrained, there have been such problems that the cylindrical member is inferior in the fitting property because the inner peripheral surface of the sleeve-like case portions, which is made of two semi-cylindrical members welded to each other, in general, is not a true circle in cross-section and has remaining burrs due to welding, or, when a large slit is formed in the outer end of the cylindrical member so as to improve the fitting property, leakage of lubricating oil through said slit is increased.

In addition, it is conceivable to weld the outer end of the cylindrical member to the inner peripheral surface of the sleeve-like case portions so as to improve the sealing property between the cylindrical member and the inner peripheral surface of the sleeve-like case portions. However, such a welding results in decreased workability, difficulties in removing chips produced by cutting work carried out thereafter, and damages to the differential gear caused by said chips.

SUMMARY OF THE INVENTION

This invention has been developed to obviate the aforesaid disadvantages of the prior art, and has as its first object the provision of a banjo type axle casing, wherein, even when the vehicle makes sharp turns in running direction, no nonuniform distribution of lubricating oil takes place; consequently, satisfactory lubricating function is readily obtainable, and moreover, an oil deflector excellent in the fitting property is provided.

The second object of this invention is to provide an oil deflector suitable for use in an axle casing in which the depth of the center case portion is equal to the inner diameter of the cross-section of the sleeve-like case portions.

The third object of this invention is to provide an oil deflector suitable for use in an axle casing in which the depth of the center case portion is smaller than the inner diameter of the cross-section of the sleeve-like case portion.

The present invention has accomplished the abovedescribed first object by providing an oil deflector for covering an axle shaft in a banjo type axle casing comprising an enlarged center case portion for housing a differential gear and a pair of sleeve-like case portions outwardly extending from opposite ends of said center case portion for housing an axle shaft, wherein said oil deflector is formed of a thin sheet free of cuts or fissures wound into a cylindrical form, only one end of said oil deflector is restrained from expanding the other unrestrained end of said oil deflector is inserted into and engaged with the inner peripheral surface of said sleeve-like case portions as an outer end which is freely radially deformable along the inner peripheral surface of said sleeve-like case portions, and the inner restrained end is spaced apart at a predetermined interval from the differential gear. Hence, such outstanding advantages can be offered that the cylindrical portion of the oil deflector can easily be accommodated to the manufacturing errors of the internal form of the sleeve-like case portion, and the fitting property of the cylindrical portion with the sleeve-like case portions is excellent. Thus, even when the vehicle makes sharp turns in the running direction or the like, lack of lubricating oil does not occur, so that satisfactory lubricating function is readily obtainable, and moreover, the press-fit insert load for fitting into the sleeve-like case portions is readily adjustable by adjusting the sheet thickness and the restraining position, and the operation of fitting into the axle casing is simple, thus permitting mass production.

The present invention has further accomplished the abovedescribed second object by an oil deflector which is formed into a cyindrical form being of a circular section having an outer diameter substantially equal to, or slightly larger than, the inner diameter of the cross-section of said sleeve-like case portions, and the forward end of the unrestrained end constituting the outer end thereof is of a slightly inwardly bent form.

The present invention has also accomplished the abovedescribed third object by an oil deflector which the sectional form of the restrained end thereof is formed into a cylindrical form substantially identical with the internal section of said sleeve-like case portions formed at the central portion thereof with a recess, and the unrestrained end is formed into a cylindrical form being of an oval section having a circumferential length substantially equal to the inner circumferential length of said sleeve-like case portions and a minor diameter substantially equal to the inner depth of said center case portion.

BRIEF DESCRIPTION OF THE DRAWINGS

The above mentioned features and objects of the present invention will become more apparent by reference to the following description taken in conjunction with the accompanying drawings, wherein like referenced numerals denote like elements, and in which.

DETAILED DESCRIPTION OF THE INVENTION

Figure 1:
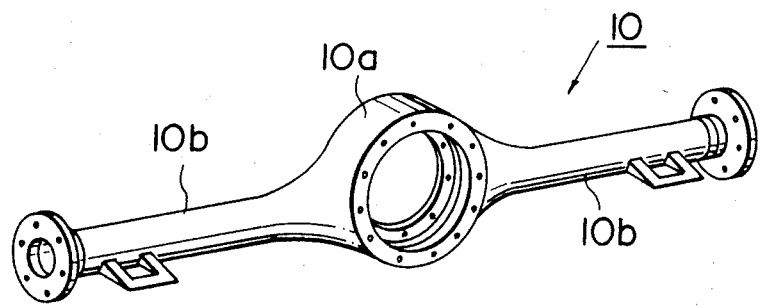
FIG. 1 is a perspective view showing the form of the banjo type axle casing.
Figure 2:
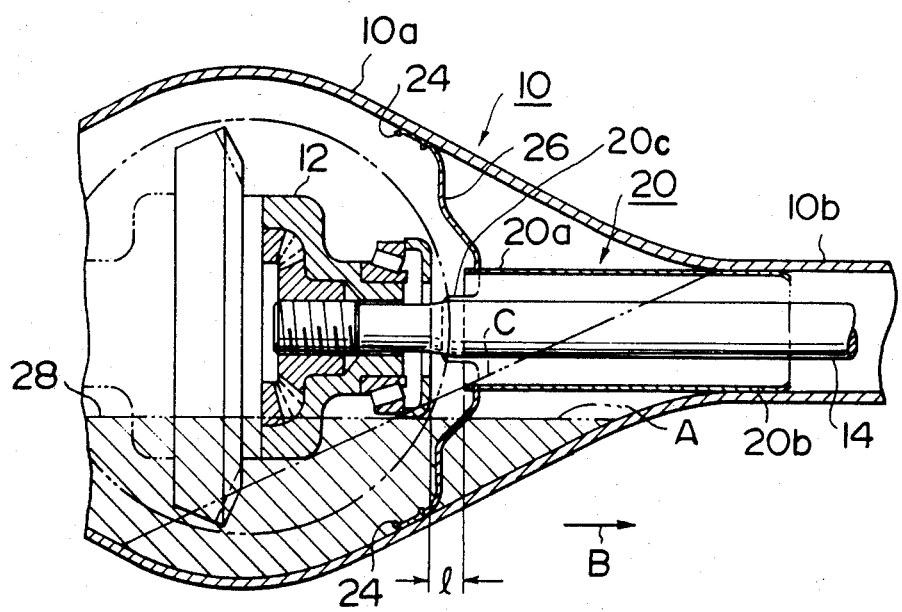
FIG. 2 is a sectional view showing construction of a first embodiment of the banjo type axle casing according to the present invention.
Figure 3:
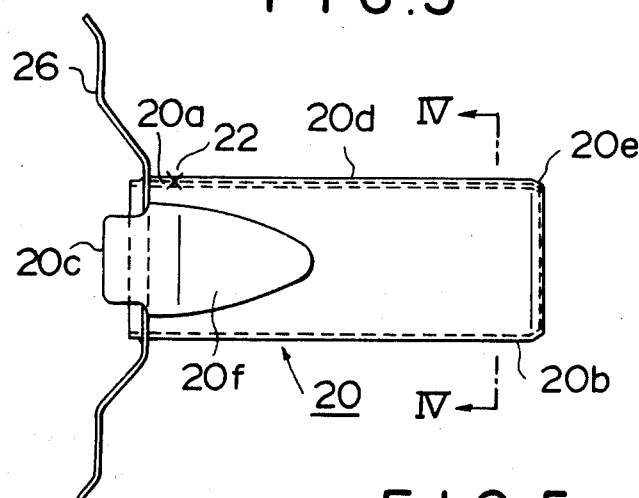
FIG. 3 is a front view showing the forms of the oil deflector and the claw member for use in said first embodiment.
Figure 4:
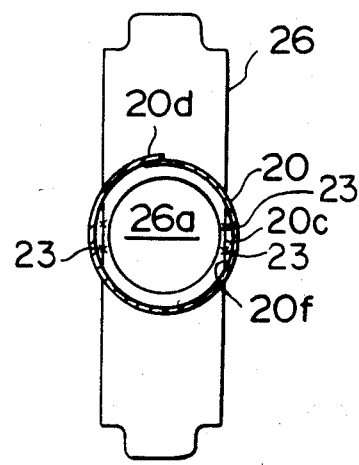
FIG. 4 is a sectional view taken along the line IV—IV in FIG. 3.

Detailed description will hereunder be given of embodiments of the present invention with reference to the drawings. As shown in FIGS. 2 to 4, a first embodiment of the present invention provides and oil deflector 20 for covering an axle shaft 14 in a banjo type axle casing 10 similar to the conventional one comprising an enlarged center case portion 10a for housing a differential gear 12 and a pair of sleeve-like case portions 10b coaxially, outwardly extending from opposite ends of said center case portion 10a. Said oil deflector 20 is formed of a thin sheet, a thin steel sheet free of cuts or fissures for example, wound into a cylindrical form, and only one end (a restrained end 20a) of said oil deflector is restrained from expanding by a single-point spot welding 22. The other unrestrained end 20b of said oil deflector is inserted into and engaged with the inner peripheral surface of said sleeve-like case portions 10b as an outer end which is freely radially deformable along the inner peripheral surface of said sleeve-like case portions 10b. The restrained end 20a of said oil deflector, as an inner end, is solidly secured through a tongue-like tab portion 20c by spot welding 23 to the central portion of a claw member 26, and spaced apart at a predetermined interval from a differential gear 12 with an overlapped portion 20d thereof being held upwardly. The claw member 26 has its upper and lower ends engaged with set plates 24 having substantially a letter C shape in cross-section and solidly secured by spot welding or projection welding to the upper and lower portions of the inner peripheral surface of said center case portion 10a. The claw member 26 is provided in the center thereof with an insert hole 26a for receiving an axle shaft, and is formed of a resiliently deformable belt-like thin sheet steel having a width substantially equal to the depth of the center case portion 10a of the axle casing 10.

Said oil deflector 20 is of such an arrangement that a thin sheet steel is wound into a cylindrical form and a single-point spot welding 22 is applied only to the overlapped portion 20d of the restrained end 20a in a manner to have an outer diameter substantially equal to, or slightly larger than, the inner diameter of the cross-section of the sleeve-like case portions 10a, and the outermost end of the unrestrained end 20b constituting the outer end thereof is of a slightly inwardly bent form 20e. This form 20e of the outermost end is for facilitating the insertion. Furthermore, the reason why the single-point spot welding 22 is applied to only one spot on the restrained end 20a of the cylindrical portion of the oil deflector 20 is that manufacturing errors may be absorbed so as to make the press-fit insert load constant, and the sealing property of the restrained end 20a with the inner peripheral surface of the sleeve-like case portions 10b may be improved. The position of said welding may be suitably adjusted in accordance with the thickness of the thin sheet steel and the press-fit insert load.

Furthermore, a recess 20f is formed at a portion contiguous to said tongue-like portion 20c of the oil deflector so that the insertion of the oil deflector into the axle casing 10 can be facilitated in spite of the difficulty in deforming the oil deflector because of being close to the spot welding 22.

The distance 1 between the welded portion of said claw member 26 and the oil deflector 20, and the differential gear 12 is determined in accordance with the required performance for preventing lubricating oil from flowing out. More specifically, if the distance 1 is small, then the deflecting action may be expected from the claw member 26 as well, and it becomes difficult for lubricating oil to flow out from the portion of the differential gear in the direction of the axle shaft.

In this embodiment, first of all, the unrestrained end 20b of the oil deflector 20 is inserted into the inner peripheral surface of the sleeve-like case portions 10b, while being freely deformed along the inner peripheral surface of said sleeve-like portions, and engaged therewith. Thereafter, the outer peripheral end of the claw member 26 solidly secured to the restrained end 20a of said oil deflector 20 is, while resiliently deforming said claw member 26, engaged with the set plates 24, thus completing the assembly.

Description will hereunder be given of action. When the vehicle stops on a level ground, the oil level of lubricating oil 28 filled in the differential gear 12 stays at a position indicated by a one-dot chain line A in FIG. 2. Consequently, during normal running condition of the vehicle on the level ground, said lubricating oil 28 is stirred by the rotation of the differential gear 12, thus enabling lubrication of the differential gear 12. In contrast to the above, when the vehicle makes a sharp turn in the running direction, the vehicle runs on a road laterally inclined, or the like, if a centrifugal force indicated by an arrow B in the drawing is applied to the vehicle for example, the lubricating oil flows to the right in the drawing, and moves in the outward and forward direction of the axle shaft 14 in case of the prior art, and the differential gear 12 is completely separated from the oil level of lubricating oil 28. As against the above, according to this embodiment, the movement of lubricating oil 28 toward the forward end of the axle shaft 14 is prevented by the insert-coupling portion between the oil deflector 20 and the sleeve-like case portions 10b of the axle casing 10, whereby, even if the centrifugal force is applied to the vehicle at the time of the sharp turn of the vehicle or the like, the oil level of lubricating oil 28 is changed from a position indicated by the one-dot chain line A to a position indicated by a two-dot chain line C, and then, the lubricating oil 28 slowly flows outwardly, so that a portion of the differential gear 12 can be reliably dipped under the level of lubricating oil for a long period of time, without failing to lubricate the differential gear 12.

In this embodiment, the claw member 26 is formed into a belt-like plate having a width substantially equal to the depth of the center case portion 10a of the axle casing 10, so that the deflecting action for the lubricating oil may be expected from said claw member 26 as well. More specifically, the movement of lubricating oil during a sharp turn of the vehicle or running on a laterally inclined road is firstly prevented by the claw member, and the further movement of lubricating oil therethrough is secondly prevented by the insert-coupling portion between the cylindrical member of the oil deflector and the sleeve-like case portions. By the double deflecting effects as described above, the deflecting action for the lubricating oil is reliably accomplished.

Figure 5:
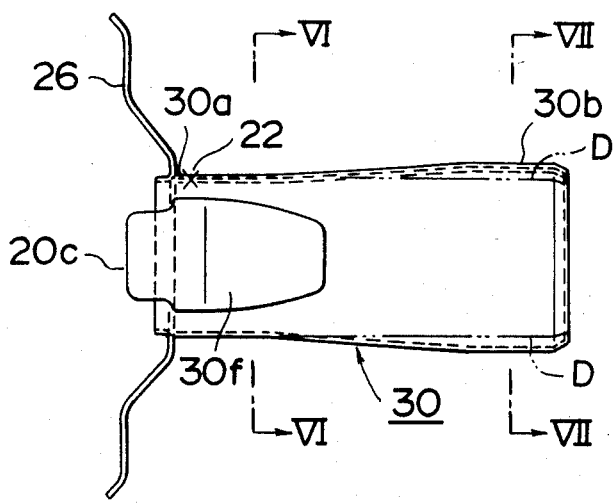
FIG. 5 is a front view showing the oil deflector and the claw member for use in a second embodiment of the banjo type axle casing according to the present invention.
Figure 6:
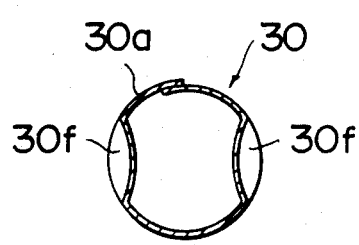
FIG. 6 is a sectional view taken along the line VI—VI in FIG. 5.
Figure 7:
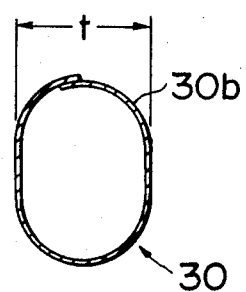
FIG. 7 is a sectional view taken along the line VII—VII in FIG. 5.

FIGS. 5 to 7 show a second embodiment of the oil deflector according to the present invention. This embodiment is applicable to the case of an axle casing in which the depth of the center case portion 10a of said axle casing 10 is smaller than the cross-section of the inner diameter of the sleeve-like case portions, and constructed such that the sectional form of a restrained end 30a of an oil deflector 30 is formed into a cylindrical form substantially identical with the internal section of sleeve-like case portions 10b formed at the central portion thereof with a recess 30f as shown in FIG. 6, and an unrestrained end 30b is formed into a cylindrical form being of an oval section having a circumferential length substantially equal to the inner circumferential length of the sleeve-like case portions and a minor diameter t substantially equal to the inner depth of the center case portion. Other points in this embodiment are similar to those in the first embodiment, and hence, description thereof is omitted.

In this embodiment, the axial length of the cylindrical portion of the unrestrained end 30b in the oil deflector 30 is substantially equal to the axial length of the center case portion 10a of the axle casing 10, so that the insertion of the oil deflector 30 into the axle casing 10 may be facilitated, and moreover, when the unrestrained end 30b of the oil deflector 30 is inserted into the sleeve-like case portions 10b, the sectional form of the unrestrained end 30b is accommodated to the sectional form of the inner periphery of the sleeve-like case portion 10b and turned into a cylindrical form substantially identical with the form of the inner peripheral surface of the sleeve-like case portion 10b, as indicated by two-dot chain lines D in FIG. 5, so that the performance for preventing the lubricating oil from flowing out can be highly improved.

In this embodiment, the sectional form of the restrained end 30a in the oil deflector 30 is substantially identical with the sectional form of the sleeve-like case portion 10b, whereby an opening height at the restrained end of the cylindrical portion of the oil deflector can be increased, so that the performance for preventing the lubricating oil from flowing out can be highly improved. However, the sectional form of the cylindrical form is not limited to the above, and it is possible to make the sectional form of the restrained end of the oil deflector to be oval similar to the sectional form of the unrestrained end. In this case, it becomes easy to manufacture cylindrical members.

Additionally, in every case of the embodiments as described above, the oil deflector is separately formed into the cylindrical form and adapted to be solidly secured to the claw member. However, the oil deflector may be wound round to be solidly secured to the claw member, whereby the restricted end of the oil deflector is restrained, or the oil deflector and the claw member may be formed into a unitary structure.

Furthermore, in every case of the embodiments as described above, the restrained end of the oil deflector is held by the claw member and the set plates. However, the means of holding the restricted end of the cylindrical portion is not limited to this.

Furthermore, in every case the embodiments as described above, the present invention is applied to the banjo type axle casing for use in the rear driving axle shaft of a motor car. However, the scope of application of the present invention is so limited, and it is evident that the present invention is generally applicable to banjo type axle casings similar to the above.

From the foregoing description, it should be apparent to one skilled in the art that the above-described embodiments are but two of many possible specific embodiments which can respresent the application of the principles of the present invention. Numerous and varied other arrangements can be readily devised by those skilled in the art without departing from the spirit and scope of the invention.

What is claimed is:

1. A banjo type axle casing comprising:
   an enlarged center case portion for housing a differential gear, a pair of sleeve-like case portions outwardly extending from opposite ends of said center case portion for housing an axle shaft, a pair of oil deflectors for preventing oil from flowing away from said differential gear into said sleeve-like case portions, said oil deflectors each comprising a thin rectangular sheet free of cuts or fissures shaped into a cylinder having axially extending overlapping portions, a single-point spot weld on said overlapping portions restraining only an inner end of said cylinder from expanding, said restrained inner end being spaced from said differential gear, and an unrestrained outer end of said cylinder in contact with and freely radially deformable along an inner peripheral surface of one of said sleeve-like case portions.

2. A banjo type axle casing as set forth in claim 1, wherein said oil deflector is formed into a cylindrical form being of a circular section having an outer diameter substantially equal to, or slightly larger than, the inner diameter of the cross-section of said sleeve-like case portions, and an outermost end of the unrestrained end consituting the outer end thereof is of a slightly inwardly bent form.

3. A banjo type axle casing as set forth in claim 1, wherein the sectional form of the restrained end of said oil deflector is formed into a cylindrical form substantially identical with the internal section of said sleeve-like case portions formed at the central portion thereof with a recess, and the unrestrained end is formed into a cylindrical form being of an oval section having a circumferential length substantially equal to the inner circumferential length of said sleeve-like case portions and a minor diameter substantially equal to the inner depth of said center case portion.

4. A banjo type axle casing as set forth in any one of claims 2 and 3, wherein the restrained end of said oil deflector is solidly secured to a resiliently deformable claw member and said claw member is engaged with set plates provided on the inner peripheral surface of said center case portion.

5. A banjo type axle casing as set forth in claim 4, wherein said claw member is formed of a belt-like thin sheet steel having a width substantially equal to the depth of said center case portion and provided in the center thereof with an insert hole for receiving an axle shaft.

6. A banjo type axle casing as set forth in claim 4, wherein said set plates have a letter C shape in cross-section.

7. A banjo type axle casing according to claim 1 in which said axially extending overlapping portions are on an upper surface of said cylinder.

8. A banjo type axle casing comprising:

an enlarged center case portion for housing a differential gear, a pair of sleeve-like case portions outwardly extending from opposite ends of said center case portion for housing an axle shaft, a pair of oil deflectors for preventing oil from flowing away from said differential gear into said sleeve-like case portions, said oil deflectors each comprising a thin sheet free of cuts or fissures shaped into a cylinder having axially extending overlapping portions, a single-point spot weld on said overlapping portions restraining only an inner end of said cylinder from expanding, said restrained inner end being spaced from said differential gear and having two tabs integral with and extending axially therefrom toward said differential gear, said restrained inner end of said oil deflector further being solidly secured to a resiliently deformable claw member by spot welding of said claw member to said tabs, said claw member being engaged with set plates provided on the inner peripheral surface of said center case portion, and an unrestrained outer end of said cylinder in contact with and freely radially deformable along an inner peripheral surface of one of said sleeve-like case portions.

9. A banjo type axle casing according to claim 8, further comprising a recessed portion in said sheet contiguous to each said tab.

10. A banjo type axle casing comprising:

an enlarged center case portion for housing a differential gear, a pair of sleeve-like case portions outwardly extending from opposite ends of said center case portion for housing an axle shaft, a pair of oil deflectors for preventing oil from flowing away from said differential gear into said sleeve-like case portions, said oil deflectors each comprising a thin sheet shaped into a cylinder having axially extending overlapping portions, a single-point spot weld on said overlapping portions restraining only an inner end of said cylinder from expanding, said restrained inner end being spaced from said differential gear, and an unrestrained outer end of said cylinder in contact with and freely radially deformable along an inner peripheral surface of one of said sleeve-like case portions;

wherein the restrained end of said oil deflector is solidly secured to a resiliently deformable claw member and said claw member is engaged with set plates provided on the inner peripheral surface of said center case portion.

* * * * *